(12) United States Patent
Kuroda et al.

(10) Patent No.: US 7,447,142 B2
(45) Date of Patent: *Nov. 4, 2008

(54) INFORMATION RECORDING MEDIUM AND INFORMATION RECORDING/REPRODUCING APPARATUS

(75) Inventors: Kazuo Kuroda, Saitama (JP); Akira Imamura, Saitama (JP)

(73) Assignee: Pioneer Corporation, Tokyo (JP)

( * ) Notice: Subject to any disclaimer, the term of this patent is extended or adjusted under 35 U.S.C. 154(b) by 692 days.

This patent is subject to a terminal disclaimer.

(21) Appl. No.: 10/925,143

(22) Filed: Aug. 25, 2004

(65) Prior Publication Data

US 2005/0073927 A1     Apr. 7, 2005

(30) Foreign Application Priority Data

Aug. 26, 2003   (JP) .............................. 2003-301123

(51) Int. Cl.
    *G11B 7/00*   (2006.01)
(52) U.S. Cl. ............... 369/275.4; 369/275.3; 369/44.13
(58) Field of Classification Search ................ 369/277, 369/278, 279
    See application file for complete search history.

(56) References Cited

U.S. PATENT DOCUMENTS 5,878,007 A * 3/1999 Matsumoto et al. ...... 369/44.34
5,999,504 A * 12/1999 Aoki ........................ 369/47.4
6,069,864 A * 5/2000 Kim ........................... 369/116
6,363,041 B1 * 3/2002 Timmermans et al. ... 369/47.15
6,549,495 B1 * 4/2003 Spruit et al. ............. 369/47.19
6,714,508 B1 * 3/2004 Spruit et al. ............. 369/275.4

FOREIGN PATENT DOCUMENTS

| JP | 7-202751    | 8/1995  |
| JP | 8-265296    | 10/1996 |
| JP | 8-293157    | 11/1996 |
| JP | 11-275053   | 10/1999 |
| JP | 2001-21665  | 1/2001  |
| JP | 2001-216650 | 8/2001  |
| JP | 2002-319245 | 10/2002 |
| JP | 2003-022539 | 1/2003  |
| JP | 2003-22539  | 1/2003  |
| JP | 2003-85896  | 3/2003  |

* cited by examiner

*Primary Examiner*—Joseph Feild
*Assistant Examiner*—Tawfik Goma
(74) *Attorney, Agent, or Firm*—Drinker Biddle & Reath LLP

(57) ABSTRACT

A groove is formed on a master disc. The groove is formed substantially along a spiral standard locus, but a groove position is displaced in a direction crossing the standard locus according to record data. The wobble is determined from a wobble signal. A wobble is formed such that an average value of displacement of the groove position with the standard locus as a reference is zero for each predetermined data unit.

5 Claims, 7 Drawing Sheets

| OFFSET VALUE | DATA ROW |
|---|---|
| 0 | A1,A2,A3,··· |
| 1 | B1,B2,B3,··· |
| 2 | C1,C2,C3,··· |
| ⋮ | ⋮ |

INFORMATION RECORDING MEDIUM AND INFORMATION RECORDING/REPRODUCING APPARATUS

BACKGROUND OF THE INVENTION

1. Field of the Invention

The present invention relates to an information recording medium on which information is recorded by using a wobble, and an information recording/reproducing apparatus.

2. Description of the Related Art

On an optical disc represented by a CD-R (Compact Disc-Recordable) and a DVD-R (DVD-Recordable), information for the recording operation of a recording apparatus, which modulates a groove to thereby record the information, is recorded in advance. However, in order to improve a SN (Signal to Noise ratio) after recording and/or in order to conceal and record (i) a key for copy control for the prevention of illegal copying and (ii) information for revoking, there is a request for reserving another recording area for the key and the information for revoking, aside from a recording area.

There is a known technique of recording the information by wobbling the position of the groove in the radial direction of the optical disc and performing spread spectrum with respect to the wobble (e.g. Japanese Patent Application Laying Open NO. 2003-22539).

This technique is such that a wobble signal is generated by performing the spread spectrum with respect to predetermined data with random data and that the position of the groove is wobbled according to the wobble signal. Since the frequency component of the wobble is expanded by the spread spectrum and the signal can be detected even in the low SN ratio, it is possible to reduce crosstalk from an adjacent track to some extent. At the same time, since the spread spectrum method is used, it is possible to improve the concealment of the data.

However, if the spread spectrum is performed by using the random data, "0" or "1" may continue longly or appear disproportionately with some probability. In this case, a record mark is formed at a position out of the center of the track. If such a groove on which the record mark is out of the center of the track is read, an optical pickup moves to follow the deviation of the groove, thereby to generate a tracking offset. As a result, when recording the data, or when reproducing the data recorded on the disc on which a mark pit is recorded by the information recording/reproducing apparatus, the following problems occur: e.g. tracking error by jumping to the adjacent track and the reduction of data reliability by crosstalk from the adjacent track. These are big problems, particularly in an optical disc with a high recording density and a narrow track pitch.

SUMMARY OF THE INVENTION

It is therefore an object of the present invention, for example, to provide an information recording medium, as well as an information recording/reproducing apparatus, by which data reliability can be improved.

The present invention will be explained hereinafter. An information recording medium of the present invention may be disc-shaped and may comprise various optical discs, such as a CD Recordable (CD-R), a Digital Versatile Disc (DVD), and a DVD Recordable (DVD-R), for example.

The above object of the present invention can be achieved by an information recording medium on which a meandered wobble is formed by displacing a groove position in a direction crossing a spiral standard locus according to record data, wherein the wobble is formed such that an average value of displacement of the groove position with the standard locus as a reference is zero for each predetermined data unit of the record data.

According to the information recording medium of the present invention, the groove is formed on the information recording medium. The groove is formed substantially along the spiral standard locus, but the groove position is displaced in a direction crossing the spiral standard locus according to the record data, which forms a meandered (i.e., wobbled) wobble. The wobble formed by the wobble is formed such that the average value (i.e., the mean value) of the displacement of the groove position is zero for the predetermined data unit with the standard locus as a reference.

In recording the pit mark onto the above-described information recording medium, tracking servo for moving an optical pick up along the wobbled track is performed. In the present invention, since the wobble is formed such that the average value of the displacement of the groove position is zero for the predetermined data unit with the standard locus as a reference, it is possible to return the position of the optical pickup to the standard locus in a short time. As a result, in recording the pit mark, or in reproducing the pit mark recorded on the disc, it is possible to decrease tracking error by jumping to an adjacent track and crosstalk from the adjacent track, thereby to improve data reliability.

In one aspect of the information recording medium of the present invention, the wobble corresponding to the predetermined data unit is provided with: a first wobble; and a second wobble, and the second wobble is formed such that the average value of the displacement of the groove position with the standard locus as a reference in the second wobble is set to cancel the average value of the displacement of the groove position with the standard locus as a reference in the first wobble.

According to this aspect, if the wobble is divided by the predetermined data unit of the record data, the average position of the record mark in the divided range agrees with the standard locus. Thus, it is possible to certainly improve data reliability.

In another aspect of the information recording medium of the present invention, the record data corresponding to the predetermined data unit is provided with: main data; and cancel data having a DC offset value to cancel a DC offset value of the main data, the groove position in the first wobble is displaced according to the main data with the standard locus as a reference, and the groove position in the second wobble is displaced according to the cancel data with the standard locus as a reference.

By constructing in this manner, the_main data may have some information, while the cancel data may be used to solve or cancel the DC offset of the wobble. The "DC offset of the wobble" means the average value of the displacement of the groove position with the standard locus as a reference. On the information recording medium, in other words, in addition to a main data area (i.e., the first wobble) in which the main data is recorded, a cancel area (i.e., the second wobble) in which the cancel data for canceling the DC offset is also provided by the predetermined data unit. Accordingly, it is possible to certainly improve data reliability.

Further in such a construction of the above described aspect related to the DC offset values of the present invention, the information recording medium may be constructed such that the main data is spread spectrum data obtained by performing spread spectrum modulation with respect to predetermined information.

By this, it is possible to increase the concealment of the main data. Incidentally, the spread spectrum data is randomized by the random data. In some cases, "1" or "0" appears continuously or disproportionately with some probability. In this configuration of the present invention, however, the wobble is formed by combining the spread spectrum data as the main data with the cancel data, so that it is possible to converge the wobble onto the standard locus in a short time.

Also, further in such a construction related to the DC offset values of the above described aspect of the present invention, the information recording medium may be constructed such that a bit row of the cancel data is set to be associated with the DC offset value of the main data.

By this, the cancel data may have any data pattern if it can cancel the DC offset of the main data. By setting the bit row of the cancel data to be associated with the DC offset value of the main data, it is possible to give a meaning to the cancel data. If illegal vendors produce a copy of the information recording medium without knowing the above-described association, it is possible to judge or determine the authenticity of the information recording medium by verifying the bit row of the cancel data.

The above object of the present invention can be also achieved by a first information recording/reproducing apparatus for recording a pit mark onto a groove formed on the above-described aspect of the information recording medium related to the DC offset values of the present invention (including its various aspects) and reproducing the main data from the information recording medium, the information recording/reproducing apparatus provided with: a reading device for irradiating light onto the groove recorded on the information recording medium and reading reflected light; a wobble signal generating device for generating a wobble signal for indicating a displaced position of the groove on the basis of an output signal from the reading device; a data reproducing device for reproducing the main data and the cancel data on the basis of the generated wobble signal; and an authenticity judging device for comparing the DC offset value of the reproduced main data with the DC offset value of the reproduced cancel data and judging authenticity of the information recording medium on the basis of a comparison result of the compared DC offset values.

According to the first information recording/reproducing apparatus of the present invention, the information recording/reproducing apparatus reproduces the main data from the above-described information recording medium and records user data by the pit mark. In operation, a pit mark reading device out of the reading device reads the pit mark from the groove formed on the information recording medium and outputs a read signal. A wobble reading device out of the reading device reads the wobble recorded on the information recording medium and outputs a wobble read signal. Then, the wobble signal generating device generates a wobble signal for indicating the displaced position of the groove on the basis of the wobble read signal. Then, the data reproducing device reproduces the main data and the cancel data on the basis of the generated wobble signal. Then, the authenticity judging device compares the DC offset value of the reproduced main data with the DC offset value of the reproduced cancel data and finally judges the authenticity of the information recording medium on the basis of the comparison result.

Accordingly, since the cancel data has a data pattern selected so that the DC offset value thereof is equal to that of the main data, if the DC offset value of the reproduced main data does not agree with the DC offset value of the reproduced cancel data, it is possible to judge that the information recording medium is false (i.e., the illegally-copied medium).

The above object of the present invention can be also achieved by a second information recording/reproducing apparatus for recording a pit mark onto a groove formed on the above-described aspect of the information recording medium wherein a bit row of the cancel data is set to be associated with the DC offset value of the main data (including its various aspects) and reproducing the main data from the information recording medium, the information recording/reproducing apparatus provided with: a reading device for irradiating light onto the groove recorded on the information recording medium and reading reflected light; a wobble signal generating device for generating a wobble signal for indicating a displaced position of the groove on the basis of an output signal from the reading device; a data reproducing device for reproducing the main data and the cancel data on the basis of the generated wobble signal; a memory device for storing the DC offset value of the main data and the bit row of the cancel data in association with each other; a detecting device for detecting the DC offset value of the reproduced main data; and a judging device for reading the bit row of the cancel data corresponding to the detected DC offset value, comparing the read bit row with the bit row of the reproduced cancel data, and judging authenticity of the information recording medium on the basis of a comparison result of the compared bit rows.

According to the second information recording/reproducing apparatus of the present invention, in advance, the memory device stores the DC offset value of the main data and the bit row of the cancel data in association with each other. Then, in the reproducing operation, the detecting device detects the DC offset value of the reproduced main data. Then, the judging device reads the bit row of the cancel data corresponding to the detected DC offset value from the memory device, compares the read bit row with the bit row of the reproduced cancel data, and finally judges the authenticity of the information recording medium on the basis of the comparison result.

In this case, the information recording medium is not judged to be true if the DC offset values of the main data and the cancel data merely agree. It is judged to be true if the cancel data has the bit row corresponding to the DC offset value of the main data. Therefore, it is possible to perform the authenticity judgment more certainly.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

The preferred embodiments of the present invention will be explained with reference to the drawings hereinafter. In the embodiments, a DVD is taken and explained as one example of the information recording medium, but it is to be understood that the present invention is not limited to the embodiments.

<1. Mastering Apparatus>

Figure 1:
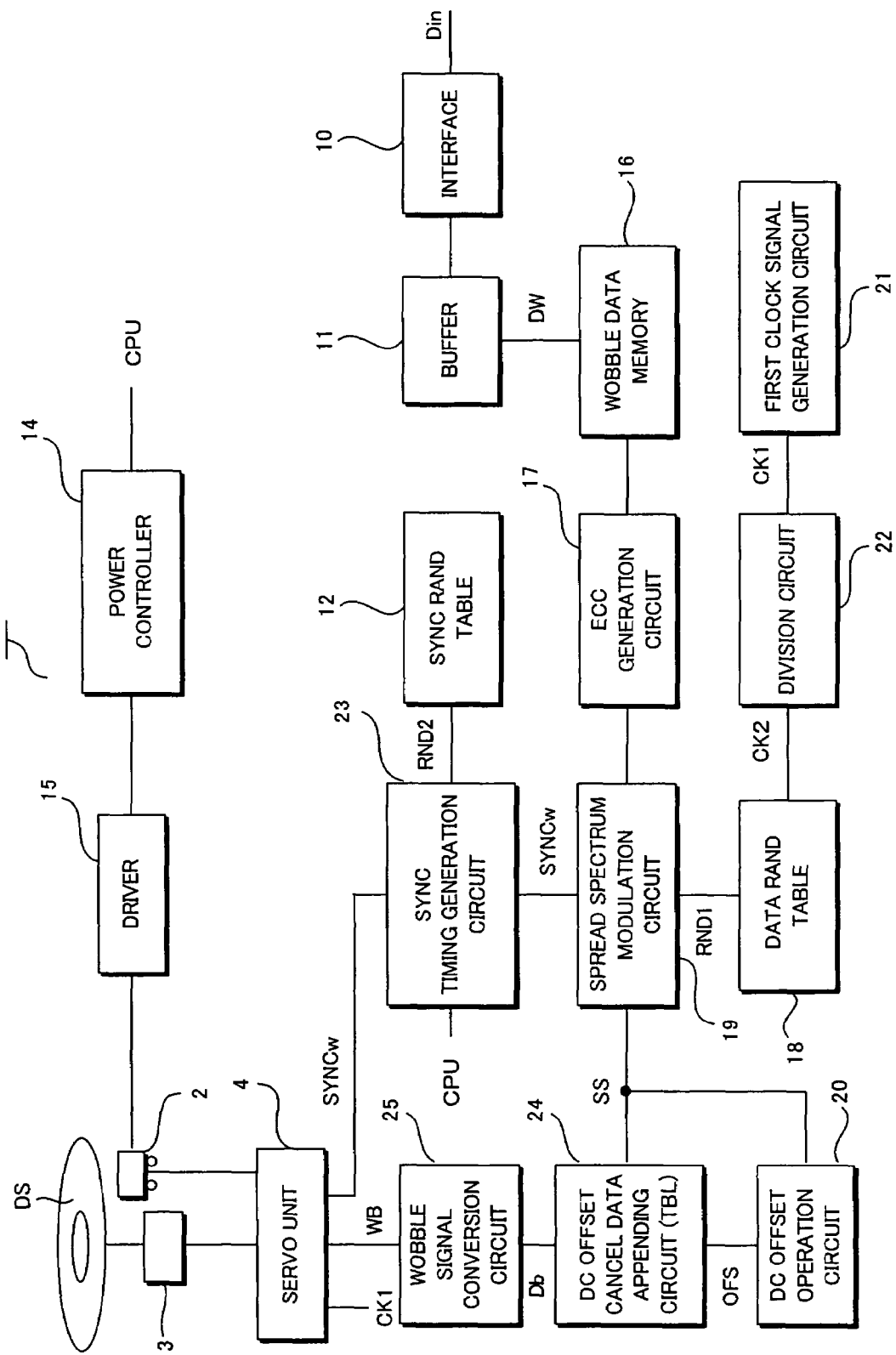
FIG. 1 is a block diagram showing the outline structure of a mastering apparatus associated with an embodiment of the present invention.

FIG. 1 shows the entire structure of a mastering apparatus. A mastering apparatus 100 is intended to make a master disc DS and is provided with: a recording unit 2; a spindle motor 3 for rotating the master disc DS; and a servo unit 4. The master disc DS is made as a glass master on which photoresist is applied, for example. The recording unit 2 is provided with: a laser diode for irradiating laser light; an optical system for focusing the laser light on the master disc DS; and a slider apparatus for moving the laser diode and the optical system as one body in the radial direction of the master disc DS. The laser diode emits the laser light with a power corresponding to a drive signal supplied from a driver 15. A power controller 14 controls the drive signal of the driver 15 according to an instruction from a Central Processing Unit (CPU). The slider apparatus moves the optical system and the laser diode in the radial direction of the master disc DS according to a control signal from the servo unit 4.

A first clock signal CK1 and a wobble synchronization signal SYNCw are supplied to the servo unit 4. In synchronization with these signals, the servo unit 4 performs spindle servo for controlling the rotation of the spindle motor 3, focus servo for controlling the focus of the laser light, and slide servo for controlling the slider apparatus. In the slide servo out of them, the control signal is generated by adding a wobble signal WB to a signal for forming a spiral standard locus or reference locus, and the slider apparatus is controlled by the control signal.

The first clock signal CK1 is generated by a first clock signal generation circuit 21. In the embodiment, the frequency of the first clock signal CK1 is 10.5 MHz. The first clock signal CK1 is a time reference for the entire system. A division circuit 22 frequency-divides the first clock signal CK1 and generates a second clock signal CK2 or the like. The frequency of the second clock signal CK2 is 420 KHz. The second clock signal CK2 is used for the generation of the wobble signal WB and is a time reference for it.

Figures 2, 3:
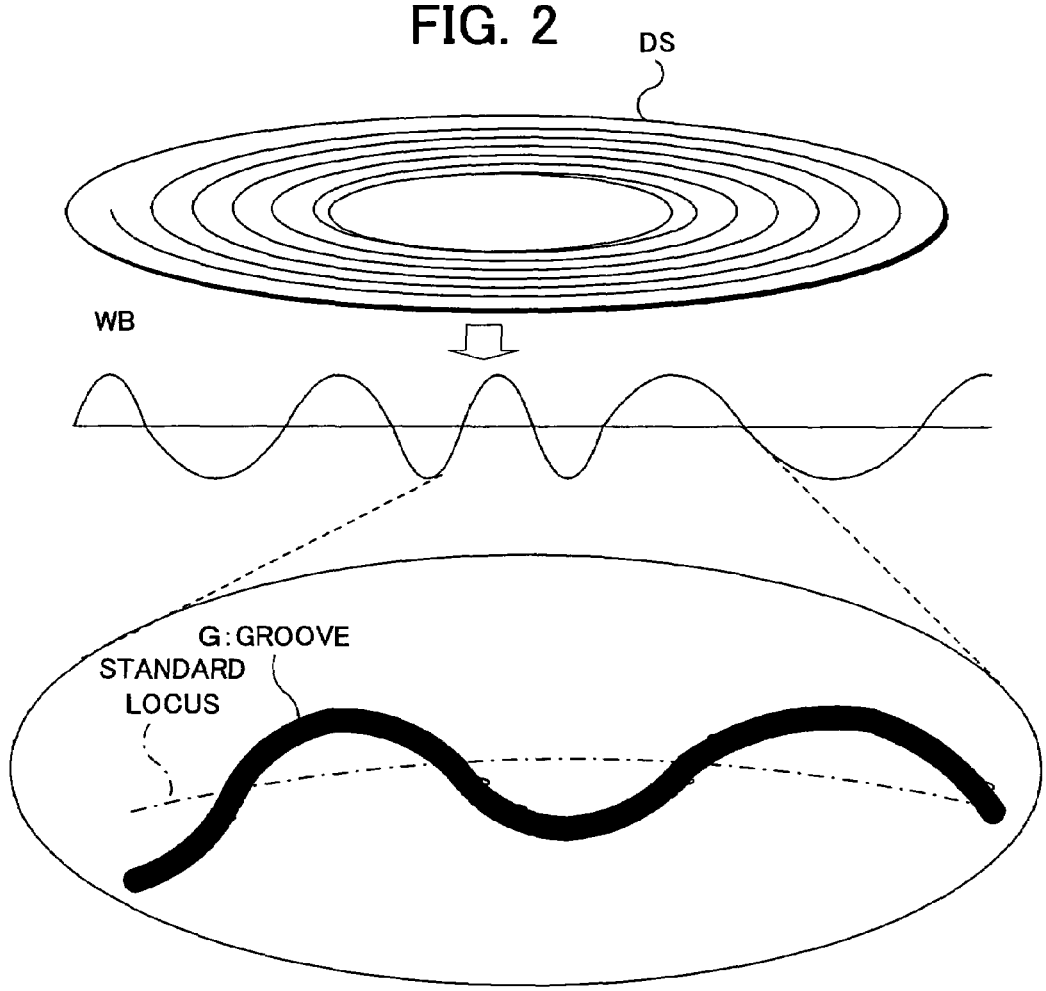
FIG. 2 is an explanatory diagram showing a groove formed on a master disc.
FIG. 3 is an explanatory diagram showing the memory content of a DC-offset-cancel-data-row table.

FIG. 2 shows a wobble formed on the master disc DS. The wobble is constructed from a groove G. The wobble is along the spiral standard locus, and the wobble, in close-up, meanders or wobbles in the direction crossing the standard locus. The wobble has a shape corresponding to the wobble signal WB.

The explanation is back now in FIG. 1. Input data Din is supplied from an external equipment to the mastering apparatus 100. The input data Din is taken into a buffer 11 through an interface 10. The input data Din taken into the buffer 11 is transferred to a wobble data memory 16 as wobble data DW, under the control of the CPU. The wobble data DW includes information for rotation control, information for recording, such as an address, and information for copy control for the prevention of illegal copying or the like, for example.

The wobble data DW stored in the wobble data memory 16 is read from there and supplied to an ECC generation circuit 17 under the control of the CPU. The ECC generation circuit 17 generates an error-correcting code ECCw on the basis of the wobble data DW and appends it to the wobble data DW. A random pattern used for the spread spectrum is stored on a data RAND table 18. The random pattern corresponds to a spread code and is a bit row generated by using a random function. The second clock signal CK2 is supplied to the data RAND table 18. The random pattern is read in synchronization with the second clock signal CK2. The read random pattern is supplied to a spread spectrum modulation circuit 19 as first random data RND1. After appending a wobble synchronization signal SYNCw to the wobble data DW, the spread spectrum modulation circuit 19 multiplies it with the first random data RND1, to thereby generate the spread spectrum data SS. The spread spectrum modulation circuit 19 can be constructed from an exclusive OR (XOR) circuit, for example.

The wobble synchronization signal SYNCw is generated by a SYNC timing generation circuit 23, under the control of the CPU. The SYNC timing generation circuit 23 uses second random data RND2 read from a sync RAND table 12, to thereby generate the randomized wobble synchronization signal SYNCw. Specifically, the SYNC timing generation circuit 23 multiplies a predetermined synchronization pattern with the second random data RND2, to thereby obtain the wobble synchronization signal SYNCw. Incidentally, it is possible to store a plurality of random patterns in the sync RAND table 12, select a random pattern according to a predetermined rule, and use the selected random pattern as the second random data RND2.

A DC offset operation circuit 20 operates a DC offset value OFS by a predetermined data unit of the spread spectrum data SS. The DC offset value OFS is generated by associating "1" of the spread spectrum data SS with "1" and associating "0" of the spread spectrum data SS with "−1" and by accumulating these conversion values by the predetermined data unit. For example, if the predetermined data unit is 16 bits (2 bytes) and the spread spectrum data SS is (0010101110111101), the DC offset value OFS is "4".

A DC offset cancel data appending circuit 24 is provided with a DC offset cancel data row table TBL. On the DC offset cancel data row table TBL, the offset value OFS and a data row are stored in association with each other as shown in FIG. 3. The data row indicates the bit row of DC offset cancel data Da, and is set to cancel the corresponding DC offset value OFS. The DC offset cancel data appending circuit 24 generates the DC offset cancel data Da by reading the data row from the DC offset cancel data row table TBL on the basis of the DC offset value OFS supplied from the DC offset operation circuit 20, and generates record data Db in which the DC offset of the record data Db is canceled by appending the generated DC offset cancel data Da to the spread spectrum data SS.

A wobble signal conversion circuit 25 converts the record data Db into the wobble signal WB. The wobble signal conversion circuit 25 in the embodiment is constructed from a band pass filter, a low pass filter, or the like, and it band limits the record data Db, to thereby generate the wobble signal WB.

Figure 4:
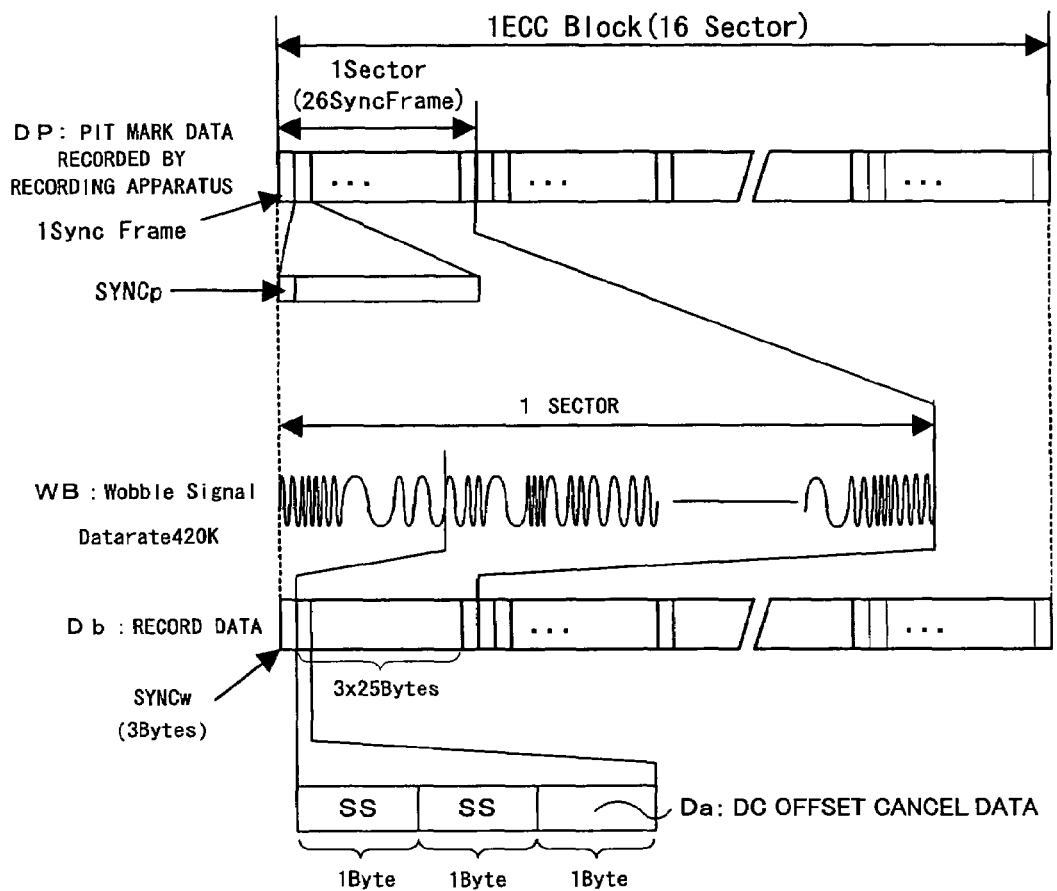
FIG. 4 is an explanatory diagram showing the data formats of pit mark data and record data.

FIG. 4 shows the data formats of pit mark data and record data, which are recorded by the information recording/reproducing apparatus. In the embodiment, the data unit of pit mark data DP to which an error-correcting code ECCp is appended is referred to as an "ECC block". One ECC block includes 16 sectors, and one sector includes 26 synchronization frames. A pit synchronization signal SYNCp is placed at the head of the synchronization frame. At the head of the record data Db of the wobble, 3 bytes of the wobble synchronization signal SYNCw is placed, correspondingly to one sector of the pit mark data DP. Following this, 3×25 bytes of data is placed. Then, one byte of the DC offset cancel data Da is appended to 2 bytes of the spread spectrum data SS. This causes the DC offset of the record data Db to be canceled by the predetermined data unit of the spread spectrum data SS (which is 2 bytes in the embodiment).

The unit for canceling the DC offset may be a predetermined data unit used if the wobble data DW before the spread spectrum is regarded as a reference. Alternatively, it may also be regarded as a predetermined data unit with the record data Db as a reference. It is also possible not to include the wobble synchronization signal SYNCw in the record data Db. Moreover, if the wobble synchronization signal SYNCw is included, the record data Db itself is preferably made with a data pattern in which the DC offset of the record data Db is canceled. Incidentally, the spread spectrum data SS corresponds to the above-described "main data", and the DC offset cancel data Da corresponds to the above-described "cancel data".

Since the spread spectrum data SS is obtained by multiplying the first random data RND1 and the wobble data DW, "1" or "0" may continue in some combinations of the symbols. However, the DC offset cancel data Da is appended to the spread spectrum data SS by the predetermined data unit, so that the wobble signal WB in the embodiment has such a waveform that the DC offset of the wobble signal WB is canceled. By forming the groove G according to the wobble signal WB, the wobble is formed so that the average value or mean value of the displacement of a groove position is zero for the predetermined data unit with the standard locus as a reference. With respect to a pit mark P recorded according to the wobble of the groove G, the average value of its displacement is also zero for the predetermined data unit.

Now, the record data Db is regarded as a group of pairs, each including the spread spectrum data SS and the DC offset cancel data Da, and one pair is regarded as the data unit. In this case, the wobble corresponding to the data unit is provided with: first wobble corresponding to the spread spectrum data SS; and second wobble corresponding to the DC offset cancel data Da. The groove position in the first wobble corresponds to the spread spectrum data SS, so that the average value of the displacement of the groove position with the standard locus as a reference is not necessarily zero. On the other hand, the groove position in the second wobble corresponds to the DC offset cancel data Da. Thus, the average value of the displacement of the groove position in the second wobble is such as to cancel the average value of the displacement of the groove position in the first wobble. As a result, in looking at the wobble by the predetermined data unit, the average value of the displacement of the groove position is zero with the standard locus as a reference. In other words, in addition to a main data area in which the spread spectrum data SS as the main data is recorded, a cancel area in which the DC offset cancel data Da for canceling the DC offset is also provided by the predetermined data unit.

In the embodiment, as described above, the record data Db and the wobble signal WB are generated so as to cancel the DC offset of the record data Db by the predetermined data unit of the spread spectrum data SS. Thus, the wobble formed on the master disc DS converges onto the standard locus in a short time. The master disc DS on which the groove G is formed by the mastering apparatus 100 is developed to be a resist master. After that, one metal master is made through an electroforming process of plating on the basis of the resist master, and then a plurality of mothers are made from the one metal master. Furthermore, a plurality of stampers are made from the plurality of mothers. An optical disc 1 is produced by pressing resin, such as plastic, by using the stamper.

Figure 5:
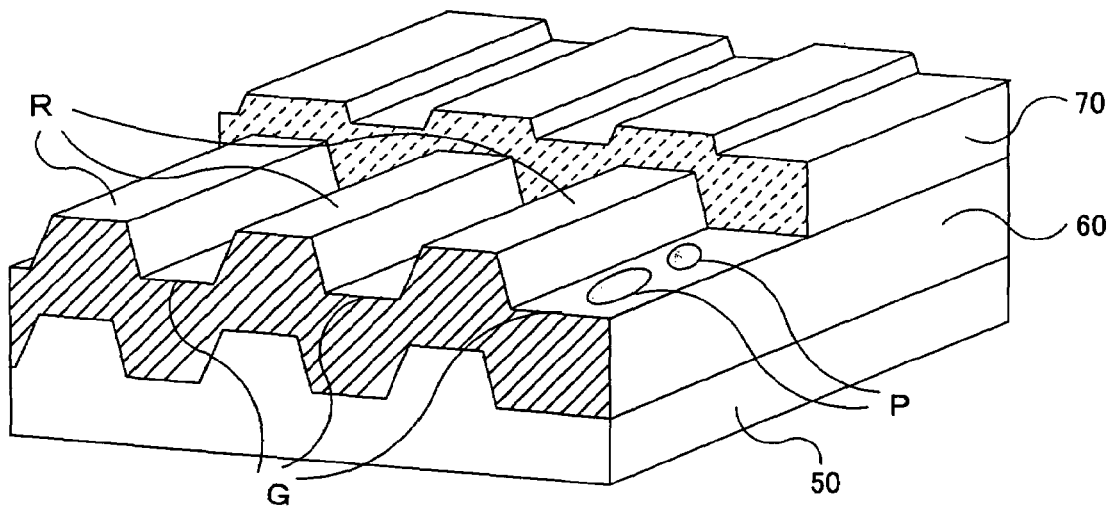
FIG. 5 is a cross-sectional perspective view showing the structure of an optical disc.

FIG. 5 shows the structure of the optical disc 1. The optical disc 1 is provided with: a substrate 50; a recording layer 60; and a reflecting layer 70, which are laminated in this order from bottom to top. The substrate 50 has a concavo-concave shape formed thereon by the above-described stamper. The concavo-concave shape is based on the wobble. Then, the recording layer 60 is formed on the substrate 50. The convex portion of the recording layer is referred to as a "land R" (which is convex on the substrate 50), and the concave portion is referred to as the "groove G" (which is grooved in the substrate 50). The pit mark P is formed by an information recording apparatus or an information recording/reproducing apparatus onto the groove G. As shown in FIG. 5, the laser light is irradiated from the bottom (through the substrate 50 which is transparent) and is reflected by the reflecting layer 70 formed on top of the recording layer 60.

The wobble formed by the groove G has such a shape that the DC offset converges in a short time. Thus, in recording information onto the optical disc 1, or in reproducing the information from the optical disc 1 on which the mark pit P is recorded by the information recording/reproducing apparatus, it is possible to return the position of an optical pickup to the standard locus in a short time. As a result, it is possible to reduce tracking error by jumping to an adjacent track and crosstalk from the adjacent track, to thereby improve data reliability.

<2. Information Recording/Reproducing Apparatus>

<2-1: Entire Structure of Information Recording/Reproducing Apparatus>

Figure 6:
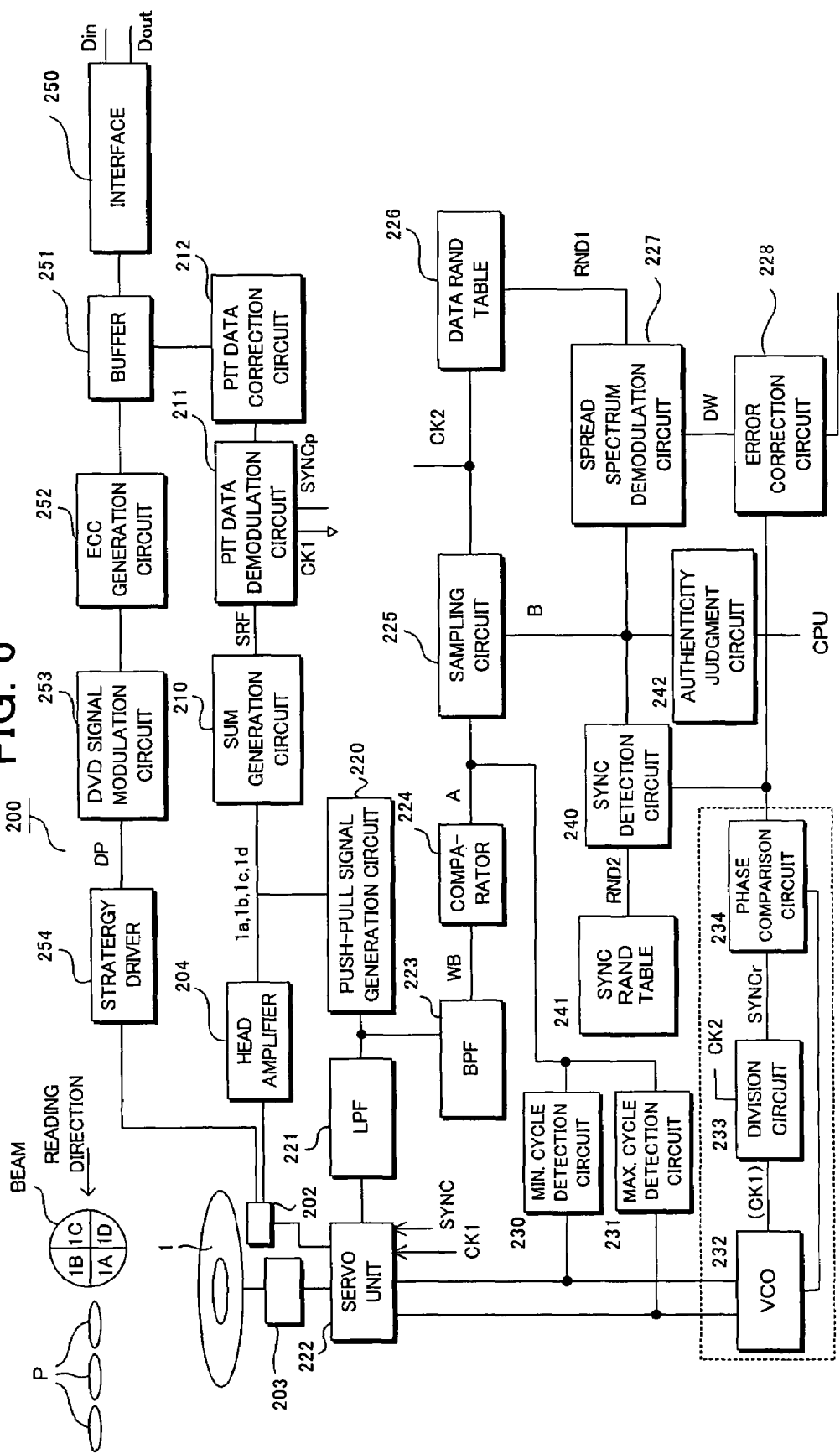
FIG. 6 is a block diagram showing the entire structure of an information recording/reproducing apparatus.

Next, the information recording/reproducing apparatus will be explained. FIG. 6 shows the entire structure of an information recording/reproducing apparatus 200. On the optical disc 1, the groove G, which meanders or wobbles with respect to the standard locus as described above, is formed as the wobble. The pit mark P is recorded onto the groove G in recording, while the pit mark P is read in reproducing.

The pit mark P corresponds to the pit mark data DP. The wobble of the groove G has a shape corresponding to the wobble signal WB. The pit mark data DP is synchronized with the first clock signal CK1. The wobble signal WB is synchronized with the second clock signal CK2. The first clock signal CK1 has a frequency N times (N: natural number) as large as that of the second clock signal CK2. In the embodiment, N=25, the frequency of the second clock signal CK2 is 420 KHz, and the frequency of the first clock signal CK1 is 10.5 MHz.

The information recording/reproducing apparatus 200 is provided with: an optical pickup 202 for irradiating a record/reproduction beam onto the optical disc 1 and for outputting a signal corresponding to reflected light; a spindle motor 203 for controlling the rotation of the optical disc 1; and a servo unit 222. The first clock signal CK1 and the pit synchronization signal SYNCp are supplied to the servo unit 222. In synchronization with these signals, the servo unit 222 performs spindle servo for controlling the rotation of the spindle motor 203 and focus servo and tracking servo for controlling the relative position of the optical pickup 202 with respect to the optical disc 1.

At first, the main structure of a recording system will be explained. The input data Din taken through an interface 250 is once stored into a buffer 251 and then supplied to an ECC generation circuit 252. After scrambling in which the data order of the input data Din is rearranged according to a preset rule, the ECC generation circuit 252 generates an error-correcting code and appends it to the scrambled input data Din. A DVD signal modulation circuit 253 modulates the output data of the ECC generation circuit 252, to thereby generate the pit mark data DP. The pit synchronization signal SYNCp generated on a not-illustrated SYNC timing generation circuit is appended to the pit mark data DP. A storage driver 254 generates a drive signal for controlling laser power according to a pit pattern of the pit mark data DP, and supplies the generated drive signal to the optical pickup 202.

The optical pickup 202 is provided with: a laser diode for irradiating the record/reproduction beam onto the groove G; and a four-division detection circuit (not-illustrated). The four-division detection circuit divides by 4 the reflected light of the reproduction beam into areas 1A, 1B, 1C, and 1D shown in FIG. 6, and outputs each signal corresponding to the quantity of light in respective one of the areas. A head amplifier 204 amplifies each output signal of the optical pickup 202, and outputs a divisional read signal 1a corresponding to the area 1A, a divisional read signal 1b corresponding to the area 1B, a divisional read signal 1c corresponding to the area 1C, and a divisional read signal 1d corresponding to the area 1D. Incidentally, the optical pickup 202 and the head amplifier 204 correspond to the above-described "reading device".

A push-pull signal generation circuit 220 calculates (1a+1d)−(1b+1c) and generates a push-pull signal. The component (1a+1d) corresponds to the areas 1A and 1D which are on the left side with respect to the reading direction, while the component (1b+1c) corresponds to the areas 1B and 1C which are on the right side with respect to the reading direction. Namely, if the reproduction beam inclines to the left side with respect to the pit, the push-pull signal will have positive polarity with the amplitude center thereof as a standard. If the reproduction beam is positioned in the center of the pit, the value of the push-pull signal will be in the amplitude center thereof. If the reproduction beam inclines to the right side with respect to the pit, the push-pull signal will have negative polarity with the amplitude center thereof as a standard. The relative position between the reproduction beam and the pit changes according to the meandering or wobbling of the track, and the value of the push-pull signal represents the relative position between the reproduction beam and the pit. Namely, the push-pull signal is a signal corresponding to the meandering or wobbling of the wobble.

The push-pull signal is outputted through a low pass filter 221 to the servo unit 222. The servo unit 222 performs tracking control on the basis of the push-pull signal. Since the optical disc 1 in the embodiment is produced by using the master disc DS which is made by the above-described mastering apparatus 100, the DC offset of the wobble is canceled by a predetermined symbol unit of the spread spectrum data SS. Therefore, it is possible to return the position of the optical pickup 202 to the standard locus in a short time in tracking servo. As a result, it is possible to reduce tracking error by jumping to an adjacent track and crosstalk from the adjacent track, to thereby improve data reliability.

Next, the main structure of a reproducing system will be explained. A sum generation circuit 210 is constructed from an addition circuit for adding the divisional read signals 1a, 1b, 1c, and 1d and for outputting a sum read signal SRF. Incidentally, the sum read signal SRF represents the length of a record mark formed on the groove G.

Figure 7:
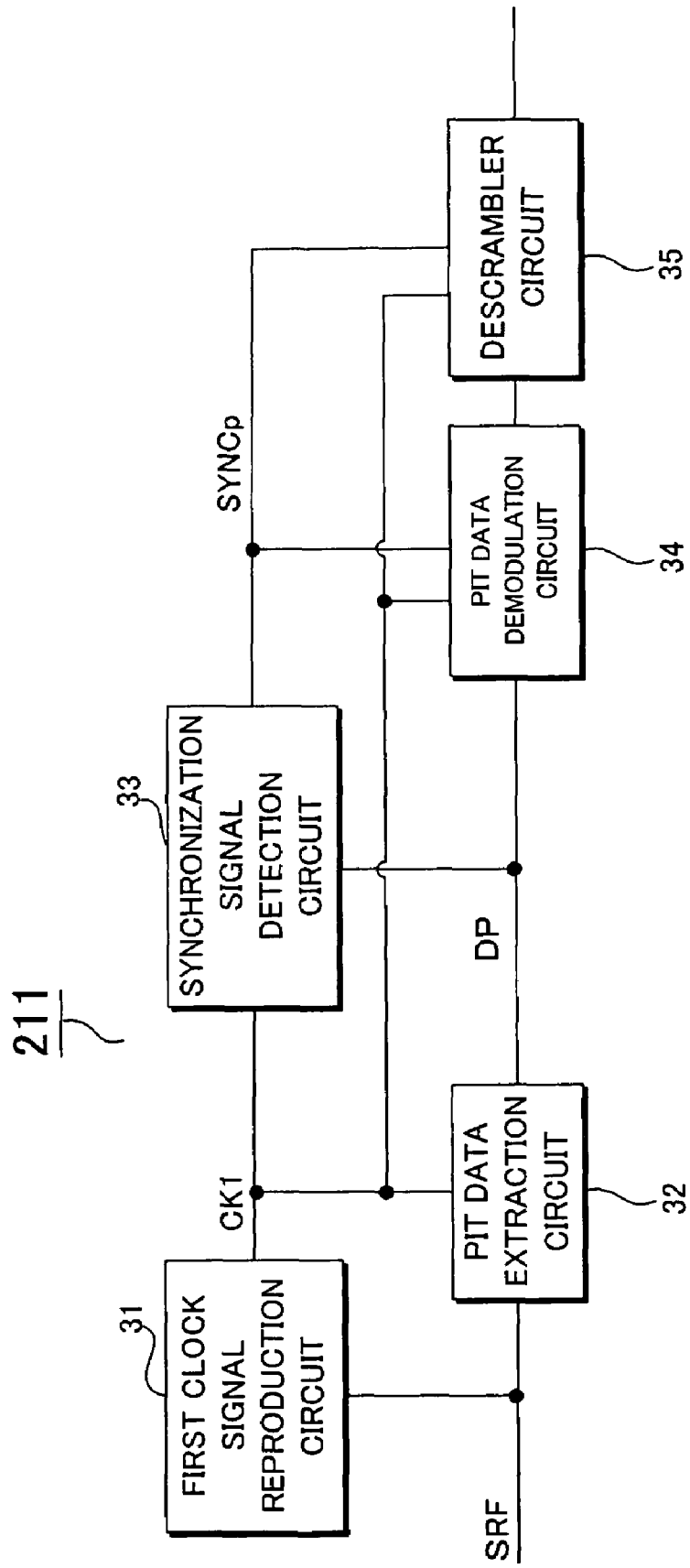
FIG. 7 is a block diagram showing the structure of a pit-data demodulation circuit.

In reproducing information recorded on the optical disc 1, A pit data demodulation circuit 211 reproduces the pit mark data DP and generates the first clock signal CK1 on the basis of the sum read signal SRF. FIG. 7 shows the structure of the pit data demodulation circuit 211. As shown in FIG. 7, the pit data demodulation circuit 211 is provided with: a first clock signal reproduction circuit 31; a pit data extraction circuit 32; a synchronization signal detection circuit 33; a pit data demodulation circuit 34; and a descrambler circuit 35.

The first clock signal reproduction circuit 31 reproduces the first clock signal CK1 synchronized with the pit mark data DP, on the basis of the sum read signal SRF. The pit data extraction circuit 32 samples, with the first clock signal CK1, a binary signal obtained by binarizing the sum read signal SRF and reproduces the pit mark data DP.

The synchronization signal detection circuit 33 detects a synchronization pattern included in the reproduced pit mark data DP and generates the pit synchronization signal SYNCp. The synchronization pattern is a particular data pattern which is not included in other pit mark data, and has a constant cycle. The pit synchronization signal SYNCp indicates the timing of the synchronization pattern.

The pit data demodulation circuit 34 generates reproduction data by demodulating the reproduced pit mark data DP with a predetermined table, with the pit synchronization signal SYNC being as a reference position. For example, if Eight to Fourteen Modulation (EFM) is used as a modulating method, the demodulation processing is performed in which 14 bits of the pit mark data DP is converted into 8 bits of the reproduction data. The descrambler circuit 35 performs descrambling in which the order of the reproduction data is rearranged according to a preset rule, and outputs the processed reproduction data.

The reproduction data obtained in this manner is supplied to a pit data error correction circuit 212 shown in FIG. 6, and after error correcting and interpolating therein, it is stored into the buffer 251. The interface 250 sequentially reads the data stored in the buffer 251, converts it into a predetermined output form, and outputs it to external equipment as output data Dout.

Out of the servos in the reproducing system, tracking servo is performed in the same manner as in the above-described recording system. On the other hand, the number of rotations of the optical disc 1 is controlled by spindle servo as follows. At first, the push-pull signal is supplied to a band pass filter 223. The pass band of the band pass filter 223 is set to extract the wobble signal WB obtained in recording from the push-pull signal. Therefore, the band pass filter 223 constitutes the above-described "wobble signal generating device" with the push-pull signal generation circuit 220, and the output signal of the band pass filter 223 is such as to reproduce the wobble signal WB from the optical disc 1.

Figure 8:
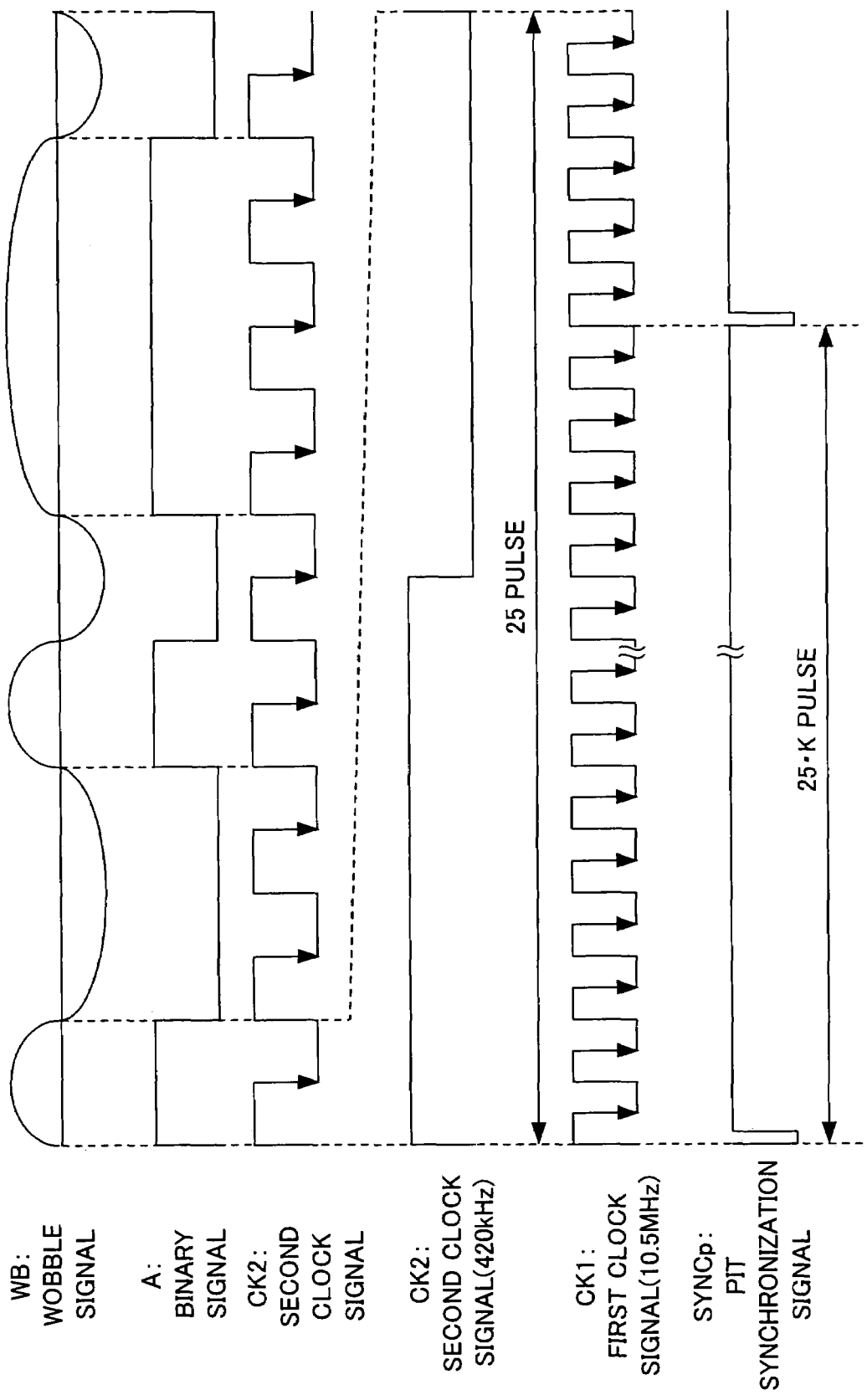
FIG. 8 is a timing chart of a wobble signal, a binary signal, a first clock signal, a second clock signal, and a pit synchronization signal.

FIG. 8 shows a timing chart of the wobble signal WB, a binary signal A, the first clock signal CK1, the second clock signal CK2, and the pit synchronization signal SYNCp (which has the same timing as the wobble synchronization signal SYNCw). A comparator 224 outputs the binary signal A obtained by binarizing the wobble signal WB. Since the wobble signal WB has a low frequency, the inclination of its waveform near zero crossing is relatively mild. Thus, the binary signal A has a large jitter component. A sampling circuit 225 samples the binary signal A by using the second clock signal CK2 and extracts the data, to thereby reproduce reproduction data B. Incidentally, the comparator 224 and the sampling circuit 225 correspond to the above-described "data reproducing device".

Back in FIG. 14, the explanation goes on. The binary signal A outputted from the comparator 224 is supplied to a minimum cycle detection circuit 230 and a maximum cycle detection circuit 231. The minimum cycle detection circuit 230 measures the average value of the minimum cycle of the binary signal A (hereinafter referred to as a "minimum average value"), while the maximum cycle detection circuit 231 measures the average value of the maximum cycle of the binary signal A (hereinafter referred to as a "maximum average value"). The minimum average value and the maximum average value are supplied to the servo unit 222 and a VCO 232.

The VCO 232 is a Voltage Controlled Oscillator, and constitutes a digital Phase Locked Loop (PLL) together with the division circuit 233 and a phase comparison circuit 234. The fundamental frequency range of the digital PLL is set by using the minimum mean (i.e., average) value and the maximum mean (i.e., average) value. This prevents the output frequency of the VCO 232 from being off frequency (i.e. shifting to too high or too low frequency), to thereby improve frequency stability.

The output frequency of the VCO 232 is the same as the frequency of the first clock signal CK1. The division circuit 233 frequency-divides the output signal (i.e. CK1) of the VCO 231, and generates the second clock signal CK2 and a reference synchronization signal SYNCr. The phase comparison circuit 234 compares the phase of the reference synchronization signal SYNCr with the phase of the reproduced wobble synchronization signal SYNCw, to thereby generate an error signal, and then sends feedback about this to the VCO 233. In this manner, the number of rotations of the optical disc 1 is controlled, and the second clock signal CK2 synchronized with the wobble data DW is reproduced.

A random pattern used for the spread spectrum modulation in recording is stored on a data RAND table 226. The random pattern corresponds to a "spread code" and is a bit row generated by using a random function. The second clock signal CK2 is supplied to the data RAND table 226. By reading the random pattern in synchronization with the second clock signal CK2, the first random data RND1 is generated. The generated first random data RND1 is supplied to a spread spectrum demodulation circuit 227.

The spread spectrum demodulation circuit 227 is provided with: a separation circuit for separating the spread spectrum data SS from the reproduction data B; and a multiplication circuit (e.g. the XOR circuit). The spread spectrum data SS extracted by the separation circuit is multiplied with the first random data RND1 on the multiplication circuit. By this, the wobble data DW is reproduced. In this case, a signal which is not within an original signal band is converted into a signal which is out of the band by the multiplication. The wobble data DW reproduced in this manner is outputted after error correcting on an error correction circuit 228.

A sync detection circuit 240 and a sync RAND table 241 are disposed in parallel with the spread spectrum demodulation circuit 227. A random pattern in recording is stored in the sync RAND table 241. The second clock CK2 is supplied to the sync RAND table 241. By reading the random pattern in synchronization with the second clock signal CK2, the second random data RND2 is generated. The generated second random data RND2 is supplied to the sync detection circuit 240. The sync detection circuit 240 matches (i) a synchronization pattern obtained by derandomizing the reproduction data B by using the second random data RND2 and (ii) a synchronization pattern stored in advance, to thereby reproduce the wobble synchronization signal SYNCw. The reproduced wobble synchronization signal SYNCw is supplied to the error correction circuit 228 and an authenticity judgment circuit 242. By this, the head of the data is judged or determined.

Figure 9:
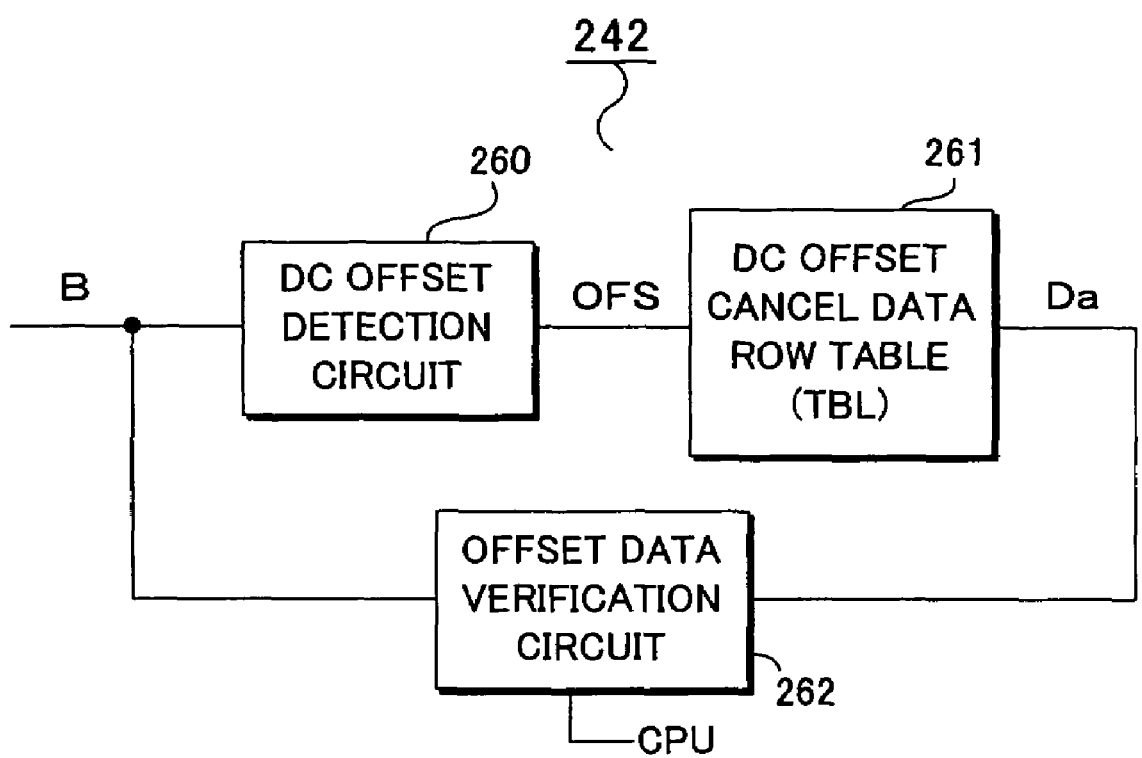
FIG. 9 is a block diagram showing the detailed structure of an authenticity judgment circuit.

FIG. 9 shows the detailed structure of the authenticity judgment circuit 242. The authenticity judgment circuit 242 is provided with: a DC offset detection circuit 260; a DC offset cancel data row table 261; and an offset data verification circuit 262. The DC offset detection circuit 260 separates the spread spectrum data SS from the reproduction data B and detects the DC offset value OFS thereof. The DC offset detection circuit 260 corresponds to the above-described "detecting device". In the embodiment, since one byte of the DC offset cancel data Da is appended to 2 bytes of the spread spectrum data SS, the DC offset value OFS is calculated with respect to the reproduced 2 bytes of the spread spectrum data SS. Incidentally, in separating the spread spectrum data SS from the reproduction data B, a reference for determining where the spread spectrum data SS starts from is required. With regard to this, the pit synchronization signal SYNCp or the wobble synchronization signal SYNCw may be the reference. In many cases, for convenience of signal processing, a previous wobble synchronization signal SYNCw is detected, and it is counted by a counter from the timing of the detected previous wobble synchronization signal SYNCw to that of a next wobble synchronization signal SYNCw.

The DC offset value OFS detected on the DC offset detection circuit 260 is supplied to the DC offset cancel data row table 261. The memory content of the DC offset cancel data row table 261 is the same as that of the table TBL in recording (refer to FIG. 3). The DC offset cancel data row table 261 corresponds to the above-described "memory device". A data row corresponding to the DC offset value OFS is read from the DC offset cancel data row table 261, and it is supplied to the offset data verification circuit 262. The offset data verification circuit 262 compares or verifies the DC offset cancel data Da separated from the reproduction data B with the read data row. The offset data verification circuit 262 generates authenticity judgment information for indicating "truth" if the both agree and indicating "falsehood" if the both do not agree, and outputs it to the CPU. The offset data verification circuit 262 corresponds to the above-described "judging device".

The DC offset cancel data Da is such as to cancel the DC offset of the spread spectrum data SS by the predetermined data unit, so that it may have many data patterns. In the embodiment, a bit row associated with the DC offset value OFS is recorded on the optical disc 1 as the DC offset cancel data Da. Therefore, the authenticity of the optical disc 1 can be judged by obtaining a data pattern set in advance on the basis of the DC offset value OFS of the reproduced spread spectrum data SS and by comparing or verifying this pattern with the DC offset cancel data Da reproduced from the optical disc 1.

Illegal copy vendors do not know the relationship between the DC offset value OFS and the DC offset cancel data Da, so that even if they copy the optical disc 1 so as to cancel the DC offset of the wobble, it is possible to judge that the optical disc 1 is illegally copied, by the above-described comparison or verification.

The CPU allows information to be reproduced from the optical disc 1 if the authenticity judgment information indicates "truth". On the other hand, it stops the reproduction of the information from the optical disc 1 and controls a loading mechanism to eject the optical disc 1 from the apparatus if the authenticity judgment information indicates "falsehood". This makes it possible to effectively forbid the reproduction of the information from the illegally copied optical disc 1.

<3. Modified Example>

The present invention is not limited to the above-described embodiments and can be modified as follows, for example.

(1) In the above-described embodiments, the spread spectrum data SS is used as the main data. However, the present invention is not limited to this, and any data may be used. Moreover, the content of the main data is not limited to management information about copyright, such as copying.

On the other hand, if the main data is used as the management information about copyright, it may be used for so-called Content Protection for Recordable Media (CPRM). In this case, a key ring referred to as Media Key Block (MKB) is recorded by the wobble of the groove G, and the key ring and a device key provided for the information recording/reproducing apparatus 200 are used for copyright protection.

(2) In the above-described embodiments, the bit row of the DC offset cancel data Da is defined as a particular data pattern associated with the DC offset value OFS of the spread spectrum data SS. However, the present invention is not limited to this, and any DC offset cancel data Da may be adopted if it can cancel the DC offset of the spread spectrum data SS. For example, it is possible to store the DC offset value OFS and a plurality of data rows in association with each other on the DC offset cancel data row table TBL shown in FIG. 3, and to randomly select the data row from them, thereby to generate the DC offset cancel data Da. In this case, on the information recording/reproducing apparatus 200, it is possible to judge the authenticity of the optical disc 1 by separating the spread spectrum data SS and the DC offset cancel data Da from the reproduction data B, by detecting the respective DC offset values OFS on a detection circuit, and by judging whether or not the both agree on an authenticity judgment circuit. Moreover, it is also possible to set a rule for selecting the bit row and specify the bit row of the DC offset cancel data Da according to this rule in reproducing.

(3) In the above-described embodiments, the DC offset is canceled by 2 byte unit of the spread spectrum data SS. However, the present invention is not limited to this, and any unit may be used if the DC offset is canceled by a predetermined data unit. For example, the DC offset may be canceled by a synchronization frame unit of the spread spectrum data SS, a synchronization frame unit of the pit mark data DP, or one ECC block unit of the pit mark data DP. Namely, in addition to a data area in which the spread spectrum data SS as the main data is recorded, a cancel area in which the DC offset cancel data Da for canceling the DC offset is recorded may be provided by the predetermined data unit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-301123 filed on Aug. 26, 2003 including the specification, claims, drawings and summary is incorporated herein by reference in its entirety.

What is claimed is:

1. An information recording medium on which a meandered wobble is formed by displacing a groove position in a direction crossing a spiral standard locus according to record data, wherein the wobble is formed such that an average value of displacement of the groove position with the standard locus as a reference is zero for each predetermined data unit of the record data, and wherein the wobble corresponding to the predetermined data unit comprises: a first wobble; and a second wobble, and the second wobble is formed such that the average value of the displacement of the groove position with the standard locus as a reference in the second wobble is set to cancel the average value of the displacement of the groove position with the standard locus as a reference in the first wobble, the record data corresponding to the predetermined data unit comprises: main data; and cancel data having a DC offset value to cancel a DC offset value of the main data, the groove position in the first wobble is displaced according to the main data with the standard locus as a reference, and the groove position in the second wobble is displaced according to the cancel data with the standard locus as a reference.

2. The information recording medium according to claim 1, wherein the main data is spread spectrum data obtained by performing spread spectrum modulation with respect to predetermined information.

3. The information recording medium according to claim 1, wherein a bit row of the cancel data is set to be associated with the DC offset value of the main data.

4. An information recording/reproducing apparatus for recording a pit mark onto a groove formed on an information recording medium and reproducing main data from said information recording medium on which a meandered wobble is formed by displacing a groove position in a direction crossing a spiral standard locus according to record data, wherein the wobble is formed such that an average value of displacement of the groove position with the standard locus as a reference is zero for each predetermined data unit of the record data, the record data corresponding to the predetermined data unit comprises: the main data; and cancel data having a DC offset value to cancel a DC offset value of the main data, the groove position in the first wobble is displaced according to the main data with the standard locus as a reference, and the groove position in the second wobble is displaced according to the cancel data with the standard locus as a reference, said information recording/reproducing apparatus comprising:

a reading device for irradiating light onto the groove recorded on said information recording medium and reading reflected light;

a wobble signal generating device for generating a wobble signal for indicating a displaced position of the groove on the basis of an output signal from said reading device;

a data reproducing device for reproducing the main data and the cancel data on the basis of the generated wobble signal; and an authenticity judging device for comparing the DC offset value of the reproduced main data with the DC offset value of the reproduced cancel data and judging authenticity of said information recording medium on the basis of a comparison result of the compared DC offset values.

5. An information recording/reproducing apparatus for recording a pit mark onto a groove formed on an information recording medium and reproducing main data from said information recording medium on which a meandered wobble is formed by displacing a groove position in a direction crossing a spiral standard locus according to record data, wherein the wobble is formed such that an average value of displacement of the groove position with the standard locus as a reference is zero for each predetermined data unit of the record data, the record data corresponding to the predetermined data unit comprises: the main data; and cancel data having a DC offset value to cancel a DC offset value of the main data, the groove position in the first wobble is displaced according to the main data with the standard locus as a reference, and the groove position in the second wobble is displaced according to the cancel data with the standard locus as a reference, a bit row of the cancel data is set to be associated with the DC offset value of the main data, said information recording/reproducing apparatus comprising:

a reading device for irradiating light onto the groove recorded on said information recording medium and reading reflected light;

a wobble signal generating device for generating a wobble signal for indicating a displaced position of the groove on the basis of an output signal from said reading device;

a data reproducing device for reproducing the main data and the cancel data on the basis of the generated wobble signal;

a memory device for storing the DC offset value of the main data and the bit row of the cancel data in association with each other;

a detecting device for detecting the DC offset value of the reproduced main data; and a judging device for reading the bit row of the cancel data corresponding to the detected DC offset value, comparing the read bit row with the bit row of the reproduced cancel data, and judging authenticity of said information recording medium on the basis of a comparison result of the compared bit rows.

* * * * *